United States Patent [19]

Brehm et al.

[11] 4,216,004
[45] Aug. 5, 1980

[54] METHOD OF BREAKING OPTICAL FIBERS

[75] Inventors: Rudolf Brehm; Adrianus J. J. Franken, both of Eindhoven, Netherlands

[73] Assignee: U.S. Philips Corporation, New York, N.Y.

[21] Appl. No.: 9,881

[22] Filed: Feb. 5, 1979

Related U.S. Application Data

[63] Continuation of Ser. No. 844,745, Oct. 25, 1977, abandoned.

[30] Foreign Application Priority Data

Nov. 1, 1976 [NL] Netherlands ........................ 7612082

[51] Int. Cl.² .............................................. C03B 37/00
[52] U.S. Cl. ............................................ 65/2; 65/4 B; 65/56; 65/105; 65/112; 65/174; 225/2; 225/96.5
[58] Field of Search ........................ 65/2, 4 B, 56, 105, 65/112, 174; 225/2, 96.5

[56] References Cited

U.S. PATENT DOCUMENTS

| | | | |
|---|---|---|---|
| 3,157,328 | 11/1964 | Hennings et al. | 225/2 |
| 3,866,449 | 2/1975 | Wakabayashi et al. | 225/96.5 X |
| 3,934,773 | 1/1976 | Chinnock et al. | 225/2 |
| 4,017,013 | 4/1977 | Hawk et al. | 225/96.5 |
| 4,036,419 | 7/1977 | Hensel et al. | 225/96.5 |

FOREIGN PATENT DOCUMENTS 37-6267  6/1962  Japan ........................................ 65/105

*Primary Examiner*—Robert L. Lindsay, Jr.
*Attorney, Agent, or Firm*—Thomas A. Briody; Jack Oisher; James J. Cannon, Jr.

[57] ABSTRACT

A method of breaking optical fibers, a fiber being scored over the entire circumference in a plane perpendicular to the fiber axis. By subsequently applying a predetermined axial tensile force to the fiber, fracture is initiated over the entire circumference of the fiber. As a result of this, fibers with a comparatively large diameter can be broken in such a way that a mirror zone is obtained across the entire fracture area. Circumferential scoring also ensures the required accuracy in respect of the perpendicular orientation of the fracture plane relative to the fiber axis.

7 Claims, 6 Drawing Figures

METHOD OF BREAKING OPTICAL FIBERS

This is a continuation of application Ser. No. 844,745, filed Oct 25, 1977, now abandoned.

BACKGROUND OF THE INVENTION

1. Field of the Invention

The invention relates to a method of breaking optical fibers destined for optical communication systems, a fiber to be broken being fixed in position, while subsequently the circumference of the fiber is scored with the aid of a scoring element, after which a predetermined axial tensile force is applied to the fiber and finally the fiber is broken at the location of the score.

2. Description of the Prior Art

Glass fibers destined for optical communication systems must comply with special requirements, so as to minimize the loss at the coupling between laser-fiber, fiber-fiber, and fiber-optical receiver. For example, the end faces of the fiber should have a surface of optical surface quality; furthermore, the end faces, in particular those of monomode fibers, should be perpendicular to the fiber axes to the highest possible degree.

Glass rods and glass fibers, scored and broken in accordance with one of the conventional methods, exhibit a characteristic morphology at the fracture surface, with a so-called mirror zone, mist zone and hackle zone; the mirror zone is a fracture surface portion of optical surface quality adjacent to the score; the hackle zone is a fracture surface portion where the fracture has separated the specimen into at least three distinct pieces; the mist zone is a fracture surface portion formed by a transition between the mirror zone and the hackle zone. This phenomenon is described comprehensively in the article by Johnson and Holloway: "On the Shape and Size of the Fracture Zones on Glass Fracture Surfaces" published in the British magazine "Philisophical Magazine", No. 14, October 1966, pages 731 to 743.

For most applications in optical communication systems the entire fracture surface of the fiber must be constituted by a mirror zone, while in many cases stringent requirements are imposed on the perpendicular circulation of the fracture surface relative to the fibre axis.

From the previously cited publication a simple, empirical equation is known, which relates the shape and size of the mirror zone to the stress distribution over the cross-section of a fiber before the initiation of fracture. For all points P of the mirror zone:

$$Z_p r^{\frac{1}{2}} = C [N/mm^{3/2}]$$

where $Z_p$ is the force component normal to the fracture plane of the local stress at the point P before fracture begins; r is the distance from the origin of fracture to the point P; C is a material constant.

For example for lead glass C has a value of approx. 5.5, for lime glass 6.0 and for quartz glass 6.5.

In order to obtain a fracture surface having only a mirror zone, each point P on the fracture surface should meet the requirement:

$$Z_p \cdot r^{\frac{1}{2}} < C [N/mm^{3/2}]$$

An other limiting factor is that the value of $Z_p$ for an arbitrary point P should not decrease to zero or even become negative, because otherwise fracture will continue in a direction which is not perpendicular to the fiber axis. In that case a so-called lip may be produced at one of the fiber ends.

A method in accordance with the preamble is known from the article by Gloge et al: "Optical Fiber End Preparation for Low-Loss Splices" published in the American journal "The Bell System Technical Journal", Vol. 52, Nr. 9, November 1973, pages 1579 to 1588. In accordance with this known method a specific decreasing stress distribution over the cross-section of the fiber is obtained by bending the fiber over a convex surface in order to obtain a low value of $Z_p r^{\frac{1}{2}}$ and thus to ensure that solely a mirror zone is produced on the fracture surface; fracture is then initiated by scoring the bent portion of the fiber at the location of maximum stress.

A drawback of this known method is that the perpendicular orientation of the fracture surface may be unsatisfactory and that a comparatively high stress of the order of magnitude of 250 $N/mm^2$ is required to initiate fracture. Moreover, the scoring element must be manipulated with care so as to minimize the disturbed area in the vicinity of the score.

SUMMARY OF THE INVENTION

It is an object of the invention to provide a method which enables fibers to be broken in such a way that an accurate and reproducible perpendicular orientation of the fracture surface is obtained and to enable a fracture surface which only has a mirror zone to be formed with fibers of a diameter greater than attainable with the known method.

According to the invention this object is mainly achieved in that the fiber is scored over the entire circumference in a plane perpendicular to the fiber axis.

In this respect score is to be understood to mean any deformation of the fiber surface such as an incision obtained, for example, with a cutter, an impression, a hair crack or in another manner.

The maximum diameter Df of a fiber which can be broken with a mirror zone across the entire fracture area is defined by the equation:

$$Z_i \cdot D_f^{\frac{1}{2}} = C$$

where $Z_i$ is the stress necessary to initiate fracture. The value of $Z_i$ is generally higher than 250 $N/mm^2$ for fiber which have only been scored locally; consequently, the maximum diameter Df will have to be smaller than 100 $\mu$m.

It has been found that by scoring the fiber over the entire circumference, a smaller value of $Z_i$ suffices to initiate fracture, which value is approximately half the value of $Z_i$ in the case of local scoring of the fiber. Due to the smaller value of $Z_i$ fibers with a largers diameter than attainable so far can be broken with the required accuracy; moreover, the fiber need be fixed less firmly so that the risk of damage is reduced.

Another significant advantage obtained by scoring the fiber over the entire circumference is that fracture is initiated over substantially the entire circumference, so that the distance over which the crack must propagate is smaller than in the case of local scoring and equals approximately half the fiber diameter; this limits the value of r resulting in low values of $Z_p \cdot r^{\frac{1}{2}}$ even for comparatively thick fiber.

Finally, circumferential scoring in a plane perpendicular to the fiber axis defines the orientation of the plane of fracture; an accurate and reproducible perpendicular orientation therefore merely depends on the scoring accuracy and can thus be kept under control.

In a preferred embodiment of the method in accordance with the invention for the purpose of scoring, the fiber and a scoring element with a straight cutting edge are positioned with their longitudinal axes perpendicular to each other and are subsequently moved relative to each other in such a way that a rolling movement of the fiber and the scoring element relative to each other is obtained through a 360° angle, the fiber and the scoring element being pressed against each other with a predetermined pressure. Due to this step, circumferential scoring with the required accuracy is possible in a comparatively simple manner. For example by rolling the scoring element around the stationary fiber in a plane perpendicular to the fiber axis it is ensured that a continuous scoring path is obtained.

Equally satisfactory results can be obtained in a simpler manner in that the fiber is rolled over a taut wire between two parallel surfaces. If the wire portion used for scribing has worn and/or is damaged, a new wire portion can simply be employed, thus increasing the reproducibility of scoring.

The width of the score is determined by the diameter of the wire. The wire diameter may vary between a few $\mu m$ and some tens of $\mu m$; preferably, the wire diameter should not exceed the fiber diameter.

In another embodiment of the method in accordance with the invention the fiber is rolled over the cutting edge of a sapphire cutter between two parallel surfaces. The sapphire cutter is less susceptible to wear than a wire and is not deformed, so that also after frequent use scoring can be effected with the required accuracy.

In a last embodiment of the method in accordance with the invention the fiber is axially passed through the opening of a diaphragm with a sharp inner edge and the fiber and the diaphragm are moved relative to each other so as to obtain an eccentric oscillating movement of the diaphragm and fiber relative to each other through a 360° angle, the fiber and the inner edge of the diaphragm being pressed against each other with a pressure of changing direction. This step enables closed circumferential scoring of the fiber in a reproducible manner. However, the oscillating movement does not result in a kinematically pure rolling movement of the fiber and inner edge of the diaphragm. Nevertheless, if the diameters of the fiber and the diaphragm opening do not differ excessively from each other, this substantially yields a rolling movement of the fiber and the inner edge of the diaphragm opening. This embodiment has the special advantage that during scoring the fiber is not subject to torsion, so that the fiber can be clamped in position in the immediate vicinity of the diaphragm.

Glass fiber broken with the method in accordance with the invention exhibit a mirror zone of optical surface quality across the entire area of fracture, with a smoothness better than 0.1 $\mu m$, while the fracture surface meets very stringent requirements in respect of the perpendicular orientation; deviations from the perpendicular orientation were not measurable. Equally satisfactory results were obtained with fiber having a diameter of $a\mu m$ and with fibers having a diameter of 110 $\mu m$.

BRIEF DESCRIPTION OF THE DRAWINGS

The invention will now be described in more detail with reference to the drawing. In the drawing.

DESCRIPTION OF THE PREFERRED EMBODIMENTS

Figure 1:
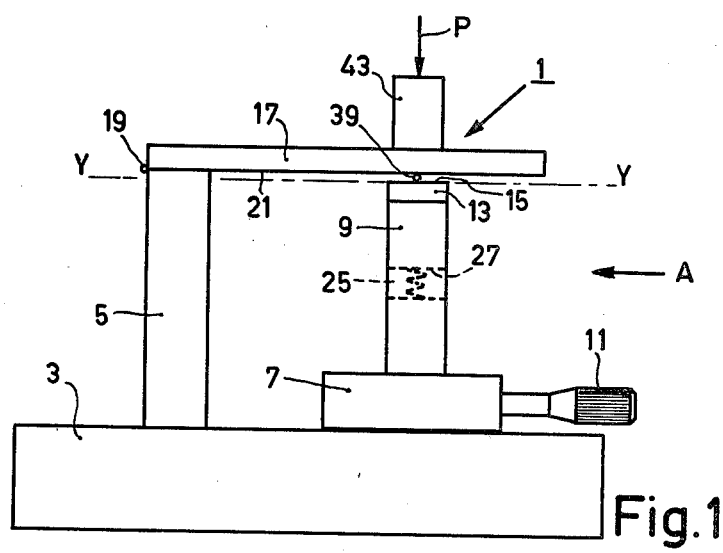
FIG. 1 is a schematic side view of a device for carrying out a variant of the method in accordance with the invention.
Figure 2:
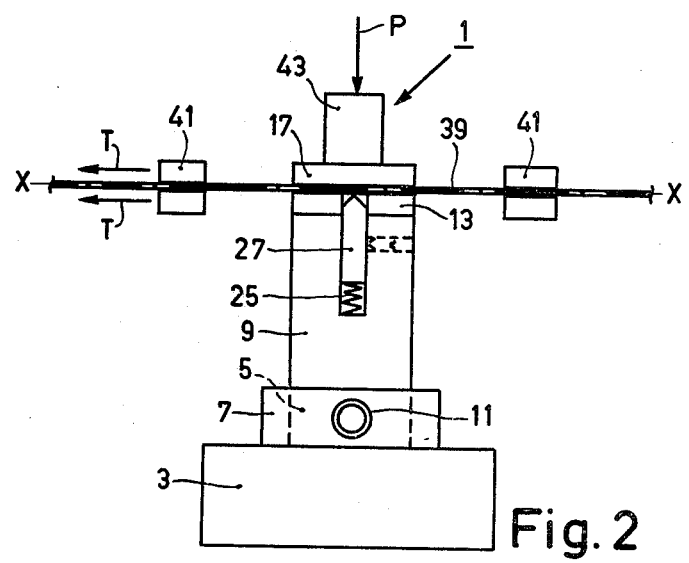
FIG. 2 is a front view of the device in accordance with the arrow A in FIG. 1.
Figure 3:
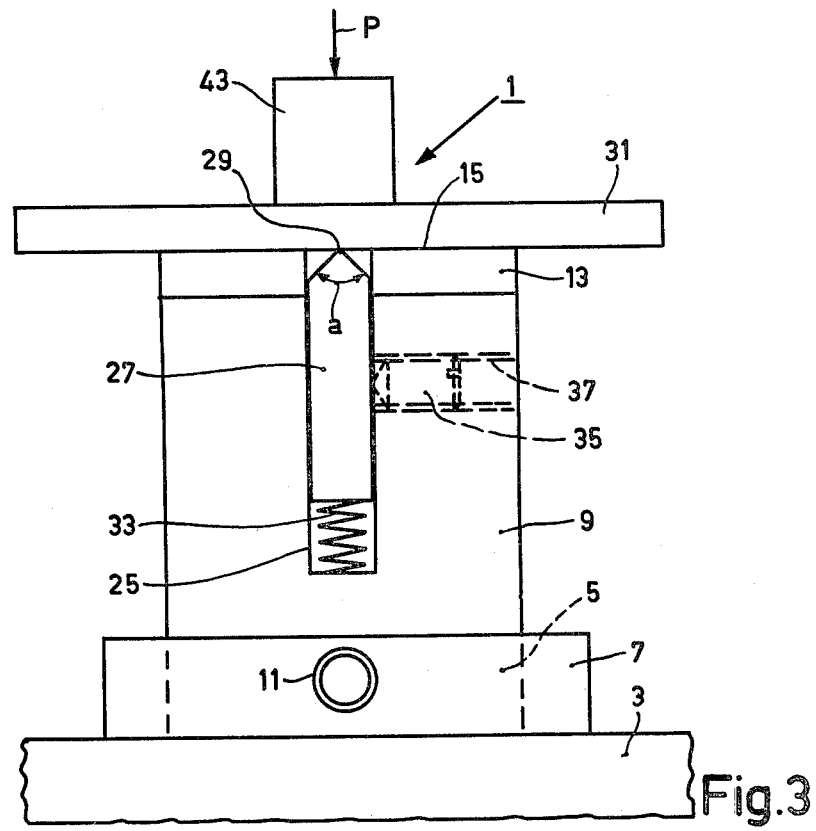
FIG. 3 shows a part of the device on an enlarged scale.

The device 1 shown in FIGS. 1, 2 and 3 comprises a base plate 3 to which a supporting block 5 and a guide 7 are secured. On the guide 7 a carrier 9 is journalled which is movable by means of micrometer screw 11 and on which a supporting plate 13 preferably of glass, is disposed. The top surface 15 of the supporting plate serves as supporting surface. A hold-down plate 17, preferably also of glass, is pivotably connected to the supporting block 5 by means of a hinge 19.

The lower surface 21 of the hold-down plate 17 serves as a pressure surface. In the carrier 9 and the supporting plate 13 a recess 25 is formed in which a sapphire cutter 27 is placed.

The cutting edge 29 (FIG. 3) of the sapphire cutter, which has an apex angle a of 90°, should be adjusted to the correct height. In view of the hardness of the sapphire cutter and the sharpness of the cutting edge, a comparatively low pressure suffices for scoring a fiber and the cutting edge of the sapphire cutter need not project from the supporting surface 15. The sapphire cutter 27 is adjusted so that the cutting edge 29 is substantially disposed in the plane of the supporting surface 15. Referring again to FIG. 3, when the hold-down plate 17 is raised for this purpose; and a glass plate 31 is placed, on the supporting surface 15. A spring 33 urges the sapphire cutter 27 with the cutting edge 29 against the underside of the glass plate 31 and the sapphire cutter 27 is fixed in this position by means of a crew 35 in a bore 37 of the carrier 9.

Referring now to FIG. 2, circumferential scoring of a fiber 39 is effected as follows:

The fiber 39 is placed on the supporting surface 15 so that the axis X—X of the fiber is perpendicular to the longitudinal axis Y—Y of the cutting edge 29. For this purpose the fiber is clamped in position in two pairs of adjustable clamping blocks 41 on both sides of the carrier 9, in such a way that the fiber follows a straight line and is disposed in one horizontal plane. Subsequently the hold-down plate 17 is lowered. A predetermined pressure P is exerted on the hold-down plate 17, by means of a weight 43 which is movable on the hold-down plate. By means of the micrometer screw 11 the carrier 9 with the sapphire cutter 27 is moved in a direction parallel to the longitudinal axis of the cutting edge 29 and over a distance which at least equals the circumference of the fiber due to the rectilinear movement of the carrier 9 the fiber is rolled over the cutting edge 29 between the supporting surface 15 and the hold-down pressure surface 21 (FIG. 1) in such a way that a closed, continuous score is formed on the circumference of the fiber. In view of the extremely small displacement the accompanying torsion of the fiber is negligible. After the weight 43 has been removed, a predetermined purely axial tensile force T is applied to the fiber 39 by displacement of one of the pairs of clamps 41, so that the fiber breaks at the location of the score.

As previously stated, the fiber may also be scored with the aid of a wire.

Figure 4:
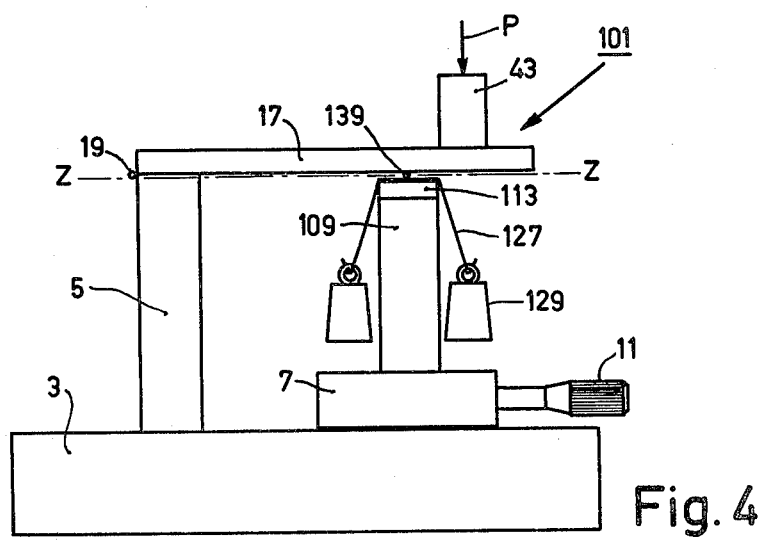
FIG. 4 schematically shows a device for carrying out another embodiment of the method in accordance with the invention.

FIG. 4 schematically shows a device 101 for implementing this variant of the method, elements which are identical to those of the device 1 bearing the same reference numerals. The device 101 also comprises a base plate 3, a supporting block 5, a guide 7, a micrometer screw 11, a carrier 109 with a supporting plate 113 and a hold-down plate 17 which is pivotably secured to the supporting block 5. In this device the carrier 109 and the supporting plate 113 need not have a recess and are solid. A wire 127 is arranged across the supporting plate 113; the wire must be of a wear-resistant material with a high degree of hardness, preferably tungsten. By means of weights 129 the wire is kept taut and is oriented so that the axis Z—Z of the wire is parallel to the direction of movement of the carrier 109.

For scoring a fiber 139 the previously described operations are carried out.

Figure 5:
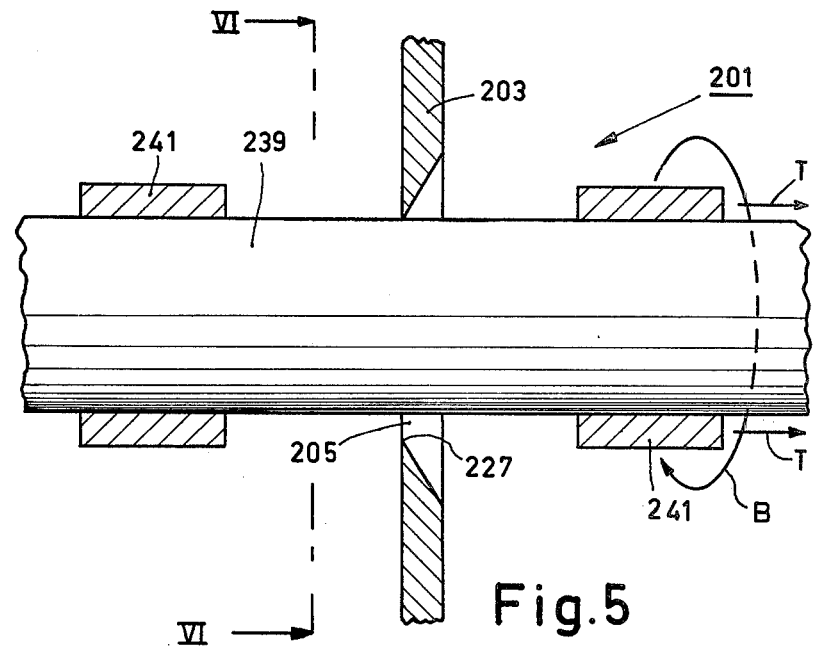
FIGS. 5 and 6 show a further embodiment of the method in accordance with the invention.
Figure 6:
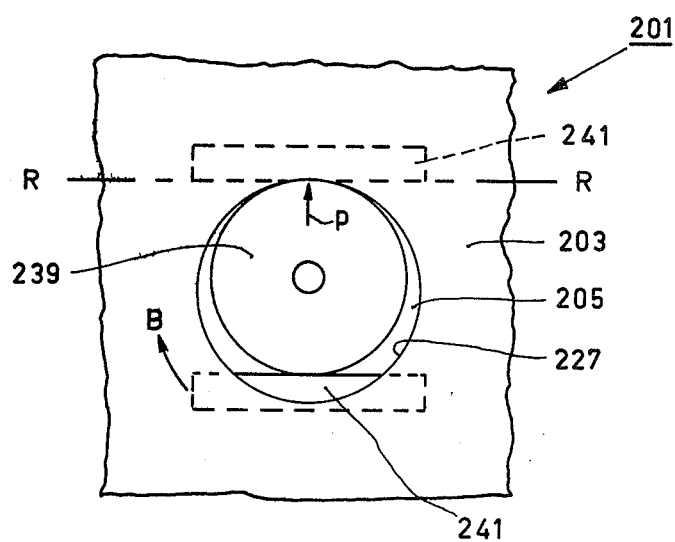

FIG. 5 in side view and FIG. 6 in cross-sectional view on the line VI—VI of FIG. 5 show a device 201 which mainly comprises a diaphragm 203 with an opening 205 whose inner edge 227 takes the form of a cutting edge, and two pairs of clamps 241. The clamps and the diaphragm can describe an eccentric oscillating movement relative to each other. A fiber to be prepared bears the reference numeral 239. For circumferential scoring of the fiber 239 said fiber is fixed in the clamps 241 in such a way that the fiber is pressed against the cutting edge 227 with a predetermined force P. In the example shown, the clamps with the fiber perform an oscillating movement in accordance with the arrow B relative to the stationary diaphragm, so that the pressure P is continuously perpendicular to the tangent R—R of fiber and cutting edge. After a continuous circumferential score has thus been formed on the circumference of the fiber an axial tensile force T is applied to the fiber by moving one of the pairs of clamps 241 in a direction parallel to the fiber axis.

During experiments lime glass fiber with a diameter of 110 μm were treated in accordance with the method described with reference to FIGS. 1 through 3. Satisfactorily results were then obtained with a pressure $P = 20.10^{-2}$ N; the required tensile stress Zi in this case was only 125 N/mm$^2$.

Equally satisfactory results were obtained with the method in accordance with FIG. 4. The fibers were of lime glass and also had a diameter of 110 μm, the pressure P was $50.10^{-2}$ N, the tensile stress Zi was also 125 N/mm$^2$. For equal values of the pressure P and the tensile stress Zi satisfactory fracture surfaces were obtained, both when using a tungsten wire with a diameter of 5 μm and a wire with a diameter of 25 μm.

What is claimed is:

1. A method of breaking an optical fiber comprising the steps of:
   fixing said optical fiber in position on a support;
   positioning a scoring element having a straight cutting edge and a longitudinal axis perpendicular to the longitudinal axis of said optical fiber;
   pressing said optical fiber and said scoring element against each other with a predetermined pressure;
   moving said scoring element and said optical fiber relative to each other so that a rolling motion of the fiber is obtained and producing a score on said fiber over its entire circumference; and
   subsequently applying a predetermined axial tensile force to said fiber so that said fiber is broken at the location of said score.

2. A method as defined in claim 1, wherein said scoring element comprises a taut wire.

3. A method as defined in claim 2, wherein said moving step comprises rolling said fiber over said taut wire between two parallel surfaces.

4. A method as defined in claim 1, wherein said scoring element comprises a sapphire cutter.

5. A method as defined in claim 4, wherein said moving step comprises rotating said sapphire cutter through an arc of 360° resulting in said fiber rolling over said cutting edge of said sapphire cutter between two parallel surfaces.

6. A method as defined in claim 2, wherein said wire has a diameter which at most equals the diameter of said optical fiber.

7. A method of breaking an optical fiber comprising the steps of:
   inserting said optical fiber through a diaphragm with a sharp inner cutting edge;
   pressing said optical fiber against said sharp inner cutter edge of said diaphragm with a pressure continuously perpendicular to the tangent formed by said fiber and said cutting edge;
   moving said fiber and said diaphragm with respect to each other through an angle of 360° so as to obtain an eccentric oscillating movement, thereby producing a score on said fiber over its entire circumference; and
   subsequently applying a predetermined axial tensile force to said fiber so that said fiber is broken at the location of said score.

* * * * *